United States Patent [19]

Celi, Jr.

[11] Patent Number: 5,317,695
[45] Date of Patent: May 31, 1994

[54] METHOD AND SYSTEM FOR PERMITTING COMMUNICATION BETWEEN A DATA PROCESSING SYSTEM AND INPUT POINTING DEVICES OF MULTIPLE TYPES

[75] Inventor: Joseph Celi, Jr., Boynton Beach, Fla.

[73] Assignee: International Business Machines Corporation, Armonk, N.Y.

[21] Appl. No.: 862,670

[22] Filed: Apr. 3, 1992

[51] Int. Cl.$^5$ ............................................. G06F 15/02
[52] U.S. Cl. .................................................... 395/275
[58] Field of Search ................. 395/275, 200; 364/200

[56] References Cited

U.S. PATENT DOCUMENTS

| | | | |
|---|---|---|---|
| 4,815,030 | 3/1989 | Cross et al. | 364/900 |
| 4,918,653 | 4/1990 | Johri et al. | 364/900 |
| 4,945,468 | 7/1990 | Carson et al. | 364/200 |
| 5,001,628 | 3/1991 | Johnson et al. | 364/200 |
| 5,157,384 | 10/1992 | Greanias et al. | 340/706 |
| 5,189,403 | 2/1993 | Franz et al. | 340/711 |

Primary Examiner—Robert L. Richardson
Assistant Examiner—Moustafa M. Meky
Attorney, Agent, or Firm—Lisa L. B. Yociss; Andrew J. Dillon

[57] ABSTRACT

A method and system for permitting communication between a data processing system and input pointing devices of multiple types. During the initialization of an operating system, a particular selectable software routine is automatically selected in response to an automatic determination that a particular type of input pointing device is coupled to the data processing system. Thereafter, the particular selectable software routine which was automatically selected permits communication between the data processing system and the particular type of input pointing device which is coupled to the data processing system.

4 Claims, 4 Drawing Sheets

METHOD AND SYSTEM FOR PERMITTING COMMUNICATION BETWEEN A DATA PROCESSING SYSTEM AND INPUT POINTING DEVICES OF MULTIPLE TYPES

CROSS-REFERENCE TO RELATED APPLICATION

The present application is related to U.S. patent application Ser. No. 862,681, entitled "Method and Apparatus for Permitting Simultaneous Communication Between A Data Processing System and a Plurality of Input Pointing Devices of Multiple Types," filed of even date herewith by the inventor hereof and assigned to the assignee herein.

BACKGROUND OF THE INVENTION

1. Technical Field

The present invention relates in general to the field of data processing systems and in particular to a method and system for permitting communication between a data processing system and a plurality of input pointing devices of different types. Still more particularly, the present invention relates to methods and systems for automatically selecting a particular software routine in response to a determination that a particular type of input pointing device is coupled to a data processing system.

2. Description of the Related Art

Modern state-of-the-art personal computers, such as the International Business Machines Corporation Personal System/2, are capable of communicating with multiple types of input pointing devices, which may include mice, track balls, pointing sticks, or touch screens. These devices permit a user to manipulate objects on a computer display screen in an intuitive graphical manner rather than by typing computer commands on a computer keyboard.

Such input pointing devices may be capable of performing many different functions and therefore may have different characteristics. Alternately, different manufacturers produce input devices which are capable of performing similar functions, but which have different characteristics. In order to communicate with such a device, the personal computer needs to include a specific software routine, commonly referred to as a device driver, which is configured for the device's unique characteristics.

Known data processing systems may include a separate device driver for each known type of input device. During installation of an operating system, existing systems generally prompt a user to indicate both the type and the characteristics of an input pointing device coupled to the personal computer. After the user provides this information about the device, known systems update a configuration file which includes information regarding the devices the user has identified as being coupled to the personal computer. The operating system then needs to be reinitialized before the device driver will be functional. If a user wishes to change an input pointing device after the operating system and device drivers have been installed on the personal computer, the user must update the configuration file, install the appropriate device driver for the new device, and then reinitialize the operating system.

Other known systems are capable of automatically configuring peripheral devices such as disk drive controllers, Token Ring adapters, and terminal emulators installed in a personal computer and optimally configuring the computer's memory allocation for each adapter.

Therefore, it should be obvious that a need exists for a method and system whereby a user may add or change input pointing devices within a data processing system without requiring the user to explicitly indicate the type and characteristics of the selected input pointing device.

SUMMARY OF THE INVENTION

It is therefore one object of the present invention to provide an improved method and system for permitting communication between a data processing system and a plurality of input pointing devices of different types.

It is another object of the present invention to provide an improved method and system for automatically determining a particular type of input pointing device which is coupled to a data processing system.

It is yet another object of the present invention to provide an improved method and system for automatically selecting a particular software routine in response to a determination that a particular type of input pointing device is coupled to a data processing system.

The foregoing objects are achieved as is now described. A method and system are disclosed for permitting communication between a data processing system and input pointing devices of multiple types. During the initialization of an operating system, a particular selectable software routine is automatically selected in response to an automatic determination that a particular type of input pointing device is coupled to the data processing system. Thereafter, the particular selectable software routine which was automatically selected permits communication between the data processing system and the particular type of input pointing device which is coupled to the data processing system.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
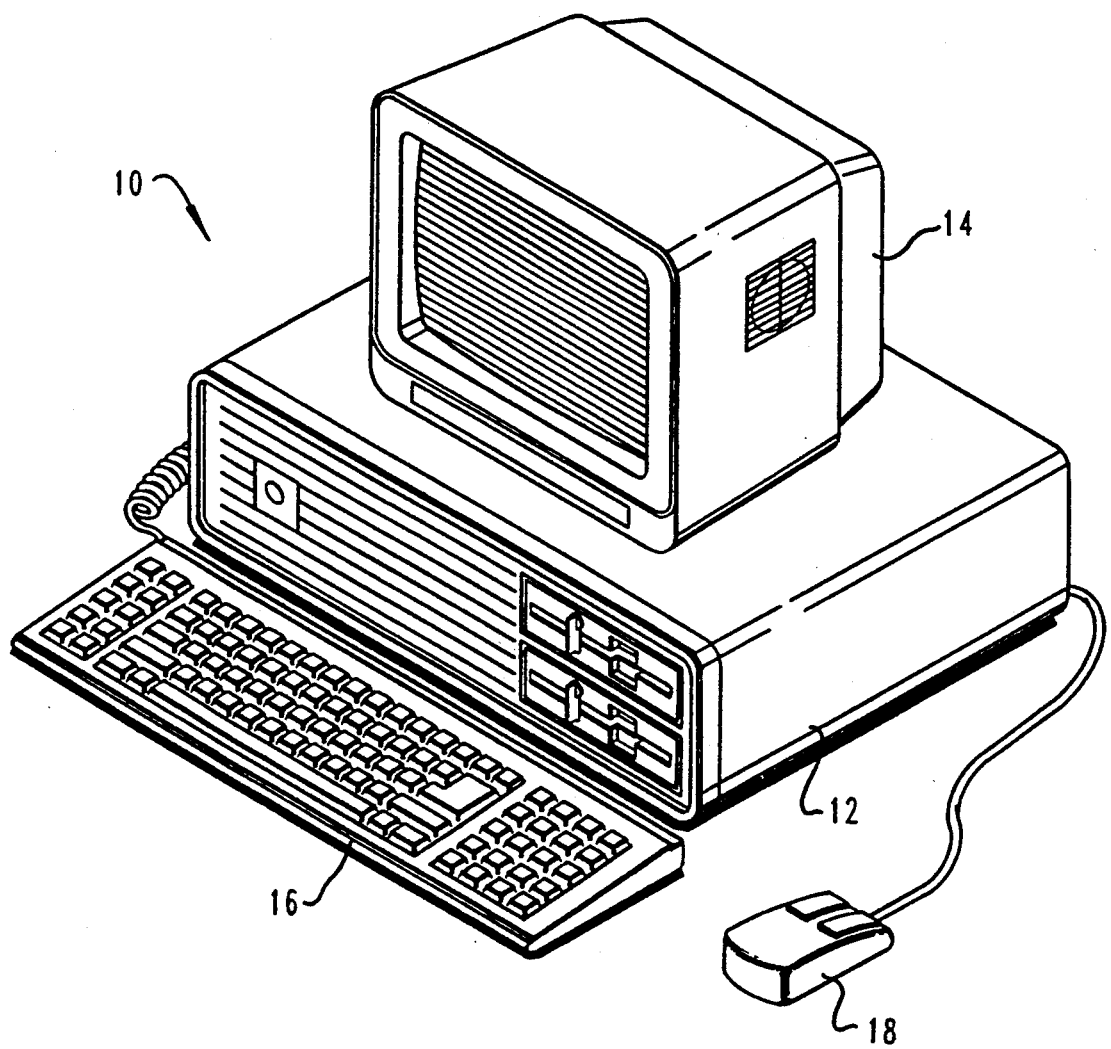
FIG. 1 depicts a pictorial representation of a personal computer system which may be utilized to implement the method and system of the present invention.

With reference now to the figures and in particular with reference to FIG. 1, there is depicted a pictorial representation of a personal computer system 10 which may be utilized to implement the method and system of the present invention. Personal computer system 10 includes a computer 12, computer display screen 14, keyboard 16, and input pointing device 18. Those skilled in the art will appreciate that input pointing device 18 may be implemented utilizing a mouse as depicted in FIG. 1, or alternatively a track ball, pointing stick, or any other device that permits a user to manipulate objects in a graphical manner on computer display screen 14.

Figure 2:
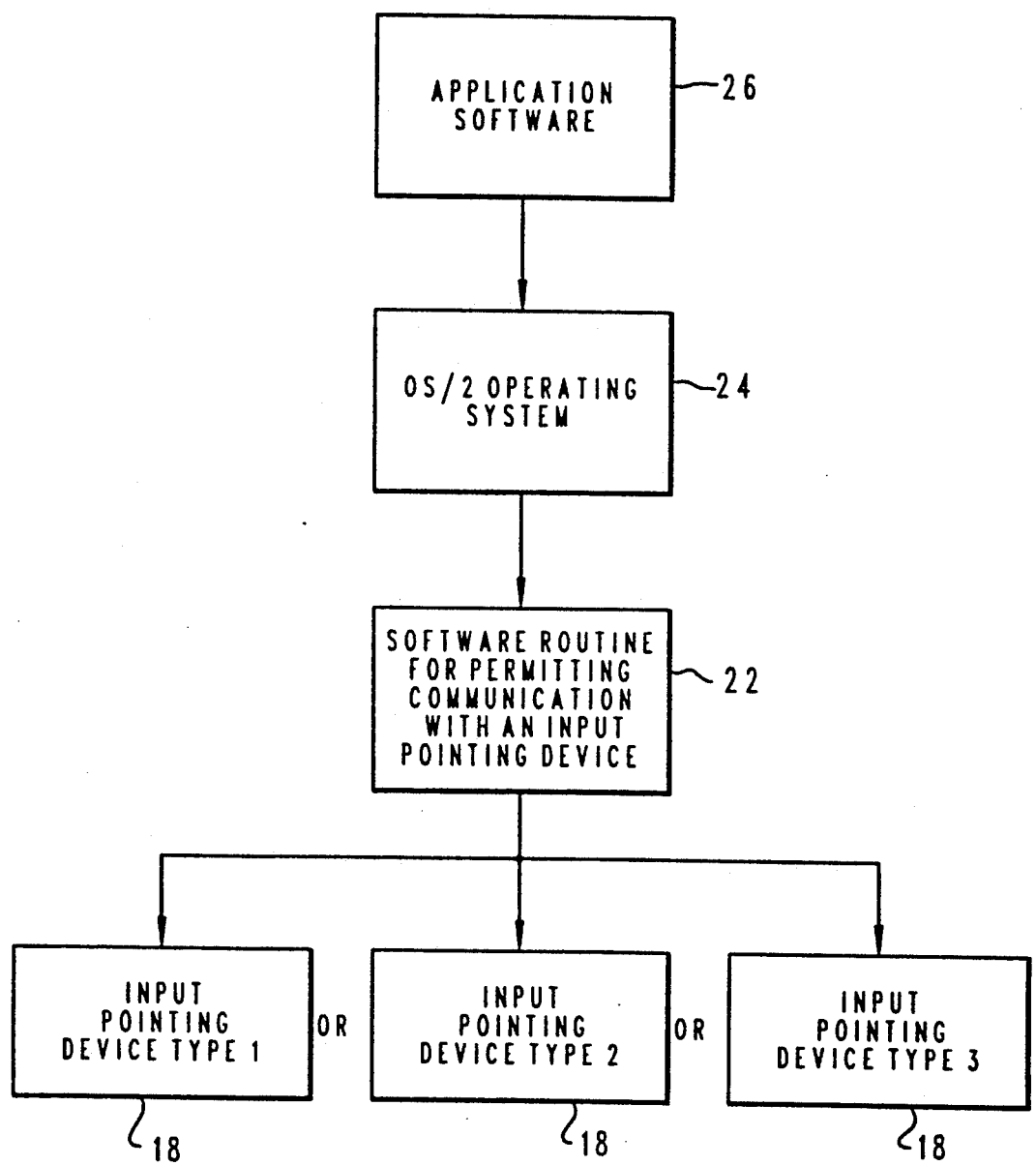
FIG. 2 depicts a pictorial representation of the relationships among software routines which may be utilized to implement the method and system of the present invention.

Referring now to FIG. 2, there is depicted a pictorial representation of the relationships among input pointing devices 18, a software routine 22 for permitting communication between input pointing device 18 and an operating system 24, and application software 26 which a user may wish to access utilizing an input pointing device 18. Application software 26 may comprise a word processing program, spreadsheet, computer game or any other software application which may be accessed utilizing an input pointing device. In order to access application software 26, commands typed on keyboard 16 or functions selected by manipulating an input pointing device 18 must be received by operating system 24, included within personal computer system 10.

Software routine 22 preferably includes information regarding characteristics of the type of input pointing device 18 which is coupled to personal computer system 10, thus permitting operating system 24 to receive the input commands. Operating system 24 may then interpret such commands and translate those commands into a format that can be readily understood by application software 26.

Figure 3:
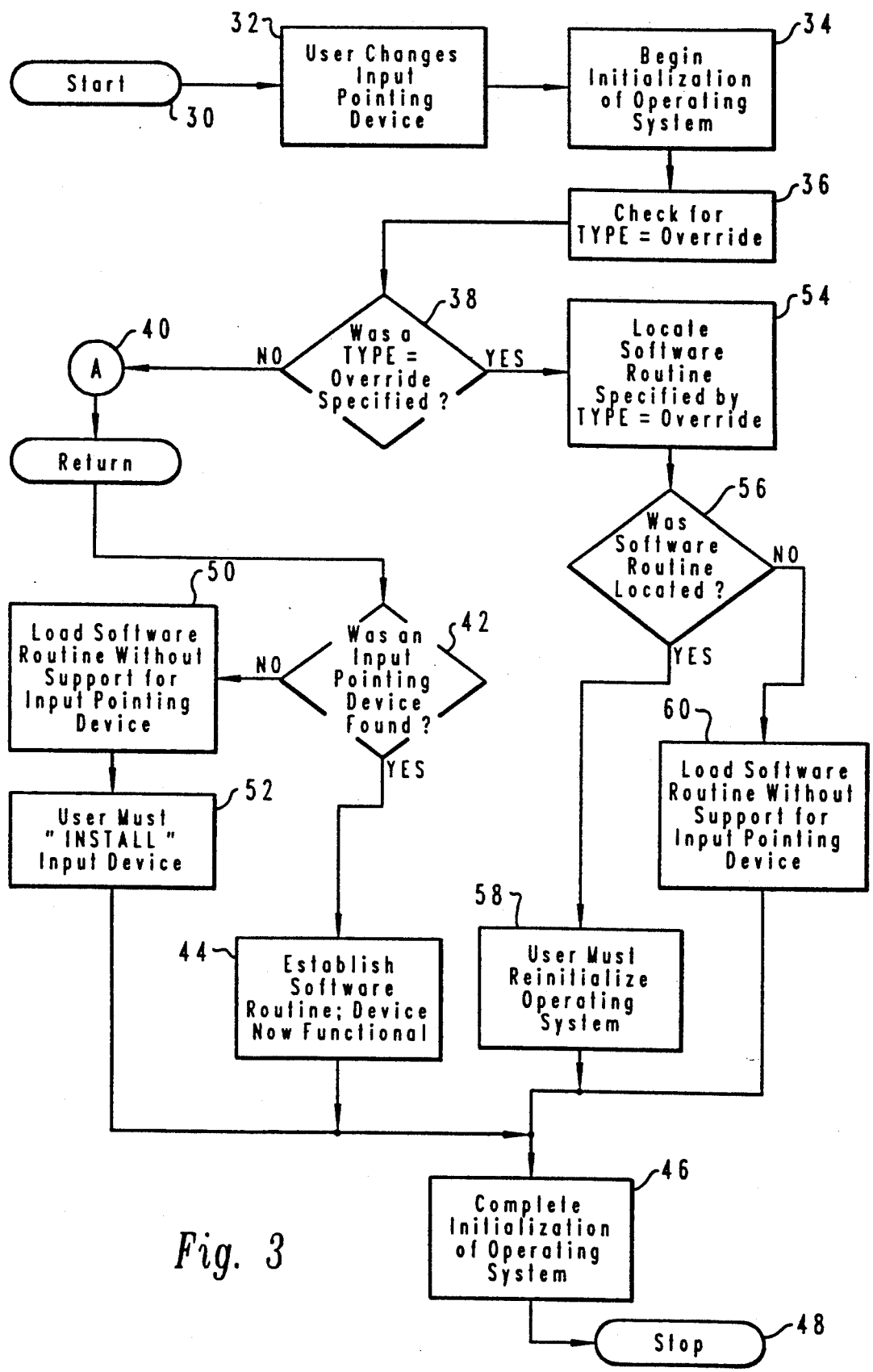
FIG. 3 depicts a high level flow chart illustrating the establishment of a software routine during the initialization of an operating system for permitting communication between an input pointing device and a personal computer system.

With reference to FIG. 3, there is depicted a high level flow chart which illustrates the establishment of software routine 22 during the initialization of operating system 24, for permitting communication between input pointing device 18 and personal computer system 10. The process begins at block 30 and thereafter passes to block 32 which depicts a user changing the type of input pointing device 18 coupled to personal computer system 10.

The process then passes to block 34 which illustrates the beginning of the initialization of operating system 24. Next, block 36 depicts checking for the "TYPE=override" statement which may be contained within a configuration file. The "override" term indicates which software routine has been selected and will vary depending on the type of input pointing device coupled to personal computer system 10. This configuration file is utilized during the initialization of an operating system 50 in order to specify various software routines which may be required in order to communicate with input pointing devices, as well as other devices which may be coupled to personal computer system 10. Next, block 38 depicts a determination of whether or not a "TYPE=override" statement was specified within the configuration file.

Figure 4:
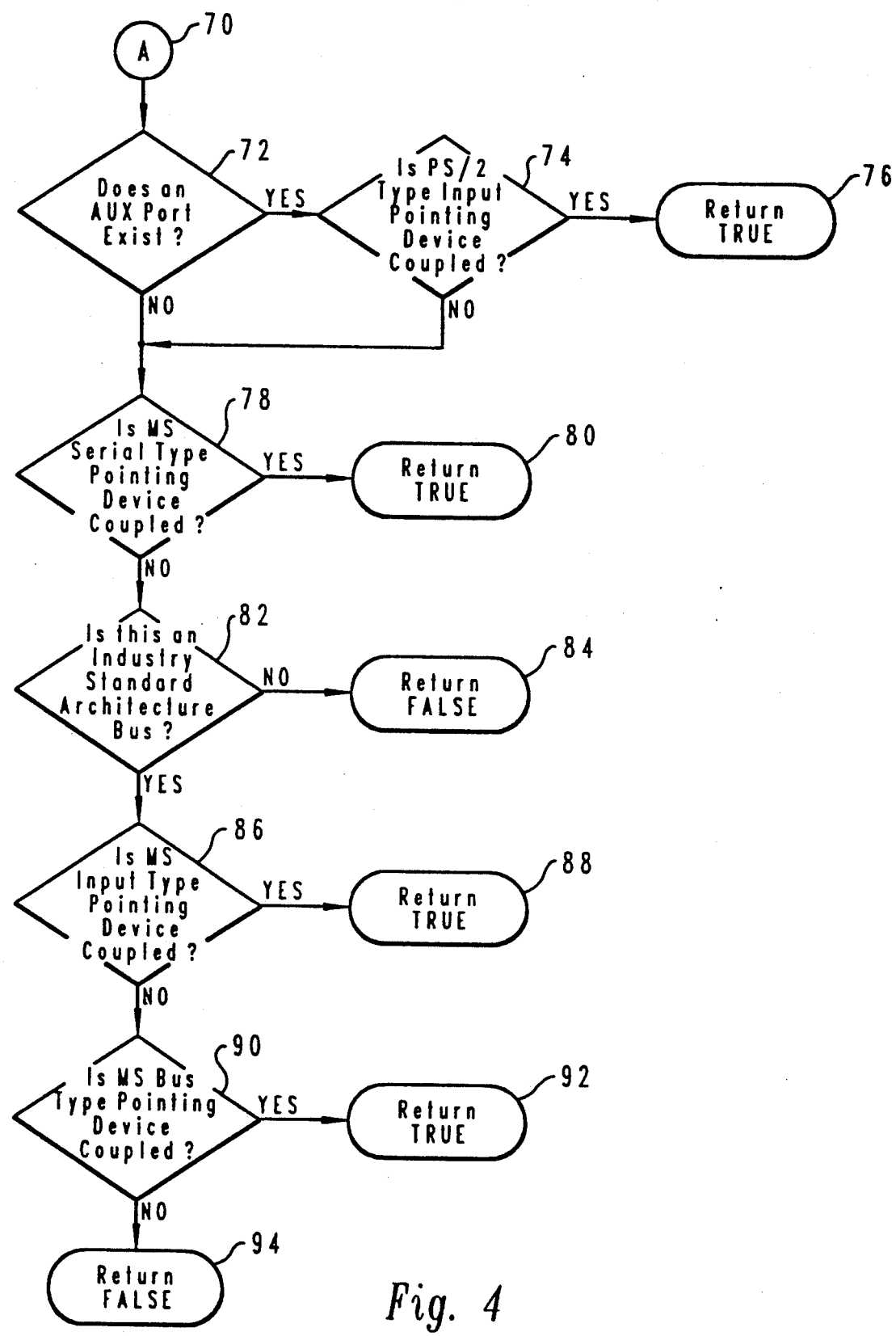
FIG. 4 depicts a high level flow chart illustrating the detection of an input pointing device coupled to a personal computer system in accordance with the method and system of the present invention.

If a determination is made that a "TYPE=override" statement was not specified within the configuration file, the process passes to the procedure described in FIG. 4. Upon returning, the process passes to block 42 which depicts a determination of whether an input pointing device was found. If a determination is made that an input pointing device was found, the process passes to block 44 which illustrates the establishment of a software routine which will permit communication between the found input pointing device and the personal computer system. The input pointing device is thereafter functional with no need for further user input. The process next passes to block 46 which depicts the completion of the initialization of the operating system. Thereafter, the process terminates, as illustrated, at block 48.

Referring again to block 42, if a determination is made that an input pointing device was not found, the process passes to block 50 which depicts the loading of a software routine which does not include the necessary information regarding the characteristics of an input pointing device which is necessary to be able to permit communication between the input pointing device and the personal computer system. Thereafter, the process passes to block 52 which illustrates that a user must "INSTALL" any input pointing device the user wishes to couple to the personal computer system.

Those skilled in the art will appreciate that the "INSTALL" process is generally recognized as a first initialization of an operating system. During "INSTALL" a software program is loaded onto the personal computer which prompts a user to identify certain devices coupled to the personal computer, such as input devices, as well as output devices which may include printers and computer display devices. After the user has supplied the required information, the software program will update the configuration file to include a reference to each device so identified. Thereafter, in order for a device to be functional, the user must reinitialize the operating system.

Thereafter, the process passes to block 46 which illustrates the completion of the initialization of the operating system. The process then terminates, as illustrated, at block 48.

Referring again to block 38, if a determination is made that a "TYPE=override" statement was specified in the configuration file, the process passes to block 54 which depicts an attempt to locate the software routine specified by the "TYPE=override" statement. Next, block 56 illustrates a determination of whether or not the software routine was located. If a determination is made that the software routine was located, the process passes to block 58 which illustrates a user reinitializing the operating system before the input pointing device associated with the software routine will be functional. The process then passes to block 46 which illustrates the completion of initialization of the operating system. The process then terminates, as depicted, at block 48.

Referring again to block 56, if a determination is made that the software routine was not located, the process passes to block 60 which illustrates the loading of a software routine which does not include the necessary information regarding the characteristics of any input pointing device which may be coupled to the personal computer system. Thereafter, the process again passes to block 46 which illustrates the completion of initialization of the operating system. The process then terminates as depicted at block 48.

Referring now to FIG. 4, there is depicted a high level flow chart which illustrates the detection of an input pointing device 18 coupled to personal computer system 10 in accordance with the method and system of the present invention.

As illustrated, the process begins at block 70 and thereafter passes to block 72 which depicts a determination of whether or not an auxiliary port exists within personal computer system 10 (see FIG. 1). If a determination is made that an auxiliary port does exist, the process passes to block 74 which depicts a determination of whether or not an IBM Personal System/2 type input pointing device is coupled to personal computer system 10. If a determination is made that an IBM Personal System/2 type input pointing device is coupled to personal computer system 10, the process passes to block 76 which depicts returning a value of TRUE.

Referring again to block 74, if a determination is made that an IBM Personal System/2 type input pointing device is not coupled to personal computer system 10, the process passes to block 78 which depicts a determination of whether or not a Microsoft serial type input pointing device is coupled to personal computer system 10. Referring back to block 72, if a determination is made that an auxiliary port does not exist, the process passes to block 78.

Referring again to block 78, if a determination is made that a Microsoft serial type pointing device is coupled to personal computer system 10, the process passes to block 80 which depicts returning a value of TRUE. Referring again to block 78, if a determination is made that a Microsoft serial type pointing device is not coupled to personal computer system 10, the process passes to block 82 which depicts a determination of whether or not the personal computer system includes an Industry Standard Architecture bus. In the event the personal computer system does not include an Industry Standard Architecture bus, the process passes to block 84 which illustrates returning a value of FALSE.

Referring again to block 82, if a determination is made that the personal computer system does include an Industry Standard Architecture bus, the process passes to block 86 which depicts a determination of whether or not a Microsoft Inport type pointing device is coupled to personal computer system 10. If a determination is made that a Microsoft Inport type pointing device is coupled to the personal computer system, the process passes to block 88 which depicts returning a value of TRUE.

Referring again to block 86, if a determination is made that a Microsoft Inport type pointing device is not coupled to personal computer system 10, the process passes to block 90 which depicts determination of whether or not a Microsoft bus type pointing device is coupled to personal computer system 10. If a determination is made that a Microsoft bus type pointing device is coupled to personal computer system 10, the process passes to block 92 which depicts returning a value of TRUE Referring again to block 90, if a determination is made that a Microsoft bus type pointing device is not coupled to personal computer system 10, the process passes to block 94 which depicts returning a value of FALSE.

In this manner the method and system of the present invention may be utilized to automatically determine if an input pointing device is coupled to personal computer system 10 and to determine a specific type of input pointing device which is utilized. Thereafter, as described above, a particular software routine may be selected for utilization with the input pointing device.

While the invention has been particularly shown and described with reference to a preferred embodiment, it will be understood by those skilled in the art that various changes in form and detail may be made therein without departing from the spirit and scope of the invention.

I claim:

1. A method in a data processing system for permitting communication between said data processing and one of a plurality of mouse pointer input pointing devices of multiple types, wherein said data processing system includes an operating system and a port for coupling a mouse pointer input pointing device to said data processing system, said method comprising the steps of:

providing a plurality of selectable software routines within said data processing system;

during initialization of said operating system, automatically determining if a selected one of said plurality of mouse pointer input pointing devices is coupled to said port of said data processing system;

thereafter, in response to a determination that a selected one of said plurality of mouse pointer input pointing devices is coupled to said port of said data processing system, automatically determining the type of said selected one of said plurality of mouse pointer input pointing devices which is coupled to said port of said data processing system; and thereafter, automatically selecting a particular one of said plurality of selectable software routines for permitting communication between said data processing system and said type of said selected one of said plurality of mouse pointer input pointing devices coupled to said port of said data processing system.

2. A method in a data processing system for permitting communication between said data processing system and one of a plurality of mouse pointer input pointing devices of multiple types, wherein said data processing system includes an operating system and a port for coupling a mouse pointer input pointing device to said data processing system, said method comprising the steps of:

during initialization of said operating system, automatically determining if a selected one of said plurality of mouse pointer input pointing devices is coupled to said port of said data processing system;

thereafter, in response to a determination that a selected one of said plurality of mouse pointer input pointing devices is coupled to said port of said data processing system, automatically determining the type of said selected one of said plurality of mouse pointer input pointing devices which is coupled to said port of said data processing system; and thereafter, automatically establishing a software routine within said data processing system for permitting communication between said data processing system and said type of said selected one of said plurality of mouse pointer input pointing devices coupled to said port of said data processing system.

3. A data processing system for permitting communication between said data processing system and one of a plurality of mouse pointer input pointing devices of multiple types, wherein said data processing system includes an operating system and a port for coupling a mouse pointer device to said data processing system, said data processing system comprising:

means for providing a plurality of selectable software routines within said data processing system;

means for automatically determining if a selected one of said plurality of mouse pointer input pointing devices is coupled to said port of said data processing system during initialization of said operating system;

means for automatically determining the type of said selected one of said plurality of mouse pointer input pointing devices which is coupled to said port of said data processing system in response to a determination that a selected one of said plurality of mouse pointer input pointing devices is coupled to said port of said data processing system; and means for automatically selecting a particular one of said plurality of selectable software routines for permitting communication between said data processing system and said type of said selected one of said plurality of mouse pointer input pointing devices coupled to said port of said data processing system.

4. A data processing system for permitting communication between said data processing system and one of a plurality of mouse pointer input pointing devices of multiple types, wherein said data processing system includes an operating system and a port for coupling a mouse pointer input pointing device to said data processing system, comprising:

means for automatically determining if a selected one of said plurality of mouse pointer input pointing devices is coupled to said port of said data processing system;

means for automatically determining the type of said selected one of said plurality of mouse pointer input pointing devices which is coupled to said port of said data processing system in response to a determination that a selected one of said plurality of mouse pointer input pointing device is coupled to said at lease one port of said data processing system; and means for automatically establishing a software routine within said data processing system for permitting communication between said data processing system and said type of said selected one of said plurality of mouse pointer input pointing devices coupled to said port of said data processing system.

* * * * *